United States Patent [19]

Raluy

[11] 4,185,676

[45] Jan. 29, 1980

[54] PNEUMATIC TIRE

[75] Inventor: Antoine Raluy, Vertaizon, France

[73] Assignee: Compagnie Generale des Etablissements Michelin, Clermont-Ferrand, France

[21] Appl. No.: 844,043

[22] Filed: Oct. 20, 1977

[30] Foreign Application Priority Data

Oct. 25, 1976 [FR] France ................................ 76 32160

[51] Int. Cl.² .......................... B60C 9/02; B60C 15/02
[52] U.S. Cl. ................................ 152/362 R; 152/379.1
[58] Field of Search ....... 152/362 R, 362 CS, 330 RF,
152/357 R, 379 R, 354, 379.1

[56] References Cited

U.S. PATENT DOCUMENTS

| 3,245,455 | 4/1966 | Lewis | 152/356 |
|---|---|---|---|
| 3,631,913 | 1/1972 | Boileau | 152/362 R |
| 3,951,192 | 4/1976 | Gardner et al. | 152/379 R |
| 3,983,918 | 10/1976 | French | 152/330 RF |
| 3,983,920 | 10/1976 | Gardner et al. | 152/362 R |
| 4,057,092 | 11/1977 | Tracy | 152/362 R |
| 4,061,172 | 12/1977 | Yoshida et al. | 152/379.1 |

FOREIGN PATENT DOCUMENTS 2362902 12/1973 Fed. Rep. of Germany .
8759 of 1913 United Kingdom .

Primary Examiner—Stephen G. Kunin
Assistant Examiner—Lawrence E. Williams
Attorney, Agent, or Firm—Brumbaugh, Graves, Donohue & Rayond

[57] ABSTRACT

A pneumatic tire with a carcass reinforcement is characterized by the fact that the portions of the carcass reinforcement which have been turned upwards around the bead rings are spread towards the outside of the tire and embedded in an annular portion of the tire which protrudes from the outer lower portion of the corresponding sidewall.

4 Claims, 3 Drawing Figures

PNEUMATIC TIRE

This invention relates to an improvement in pneumatic tires and more particularly, but not exclusively, to pneumatic tires of the type having a radial carcass reinforcement. The improvement is directed at eliminating shear stresses between the carcass plies and the portions thereof which are turned around the bead rings.

It is known that the carcass ply or plies are turned around the bead rings and then extend upwards in the sidewalls to a greater or lesser height in the direction towards the tread in order to be able to withstand the tensile stresses to which they are subjected during the use of the tire. As these stresses act in opposite direction on the carcass ply or plies proper and their upward turned portions, they cause shearing in the intermediate rubber.

Furthermore, the flexings of the sidewalls during travel subject the carcass reinforcement and the upward-turned portions thereof to alternate stresses, in opposite directions, which cause shear stresses in this same zone. All of these stresses may lead to the rupture of the intermediate rubber and premature destruction of the tire.

It has been attempted to avoid these drawbacks by extending the upward turned portions of the carcass plies into zones of lesser shear, that is to say higher up in the sidewalls; however, in such cases the rigidity of the sidewalls is increased; ruptures of the upward turned portions of the plies may take place by compression in the sidewalls and in any event the road behavior of the tire is greatly modified.

A pneumatic tire with a carcass reinforcement improved in accordance with the invention is characterized by the fact that the portions of said carcass reinforcement which have been turned upwards around the bead rings are spread towards the outside of the tire and embedded in an annular portion of the tire which protrudes from the outer lower portion of the corresponding sidewall.

In one preferred embodiment of the invention, the said annular portion is separated from the outer lower portion of the sidewall by a circular groove.

Among the possible variants of the invention, one consists in arranging each upward turned portion of the carcass reinforcement approximately parallel to the engagement surface of the bead on the rim.

Another variant consists in the fact that the direction of spread of the upward turned portions of the carcass reinforcement towards the outside is substantially parallel to the axis of rotation of the tire.

The length of the upward turned portions is determined in such a manner as to assure sufficient anchoring of the carcass reinforcement in the rubber of the tire.

In accordance with the invention, a mechanical decoupling is obtained between the elastic matrices surrounding the carcass reinforcement, on the one hand, and its upward turned portions, on the other hand, respectively, thus eliminating shearing in these zones.

Furthermore, the circular groove formed between the annular projection and the lower portion of the sidewall makes it possible to retain reduced thickness, and therefore good flexibility, for the sidewall over a greater length towards the bead rings; this results in a better distribution of the flexings which is particularly advantageous with tires having a small height to width ratio (for example of the order of 0.6).

Referring to the accompanying drawing, there will now be described two non-limitative examples of the invention.

Figure 1:
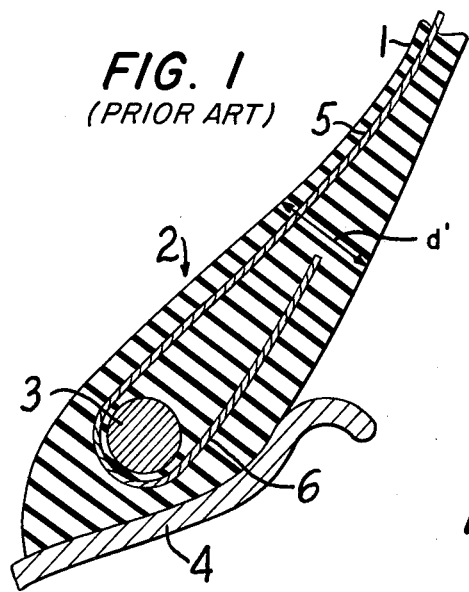
FIG. 1 is a radial sectional view through the portion of a pneumatic tire of known type, taken close to the wheel rim.

FIG. 1 shows, in radial cross section, a portion of a pneumatic tire with a radial carcass ply; a sidewall 1 is terminated on the wheel side by a bead 2 provided with a bead ring 3 and resting against a rim 4 along a so-called engagement surface; the carcass ply 5 is turned upwards around the bead ring 3, as shown at 6.

Figure 2:
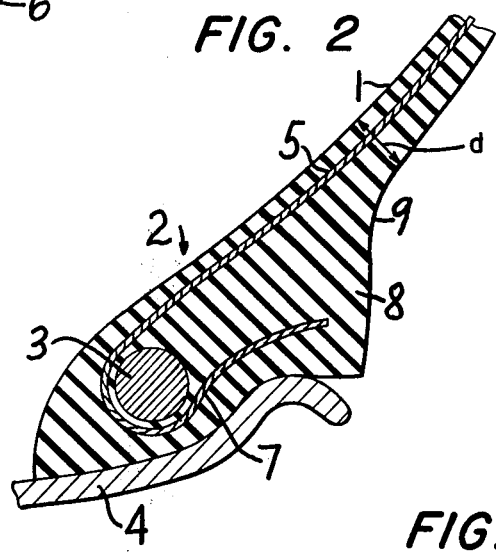
FIGS. 2 and 3 are radial sectional views, in the same region, of improved tires in accordance with the invention.

FIG. 2 shows, again in radial cross section, an improved tire in accordance with the invention; the upward-turned portion 7 of the carcass ply 5 is moved away or diverges from the sidewall portion of the carcass ply 5 towards the outside of the tire (right-hand side of the drawing). This upward-turned portion 7 is embedded in an annular portion 8 of the tire which forms a protrusion with respect to the outer lower portion 9 of the sidewall 1.

Figure 3:
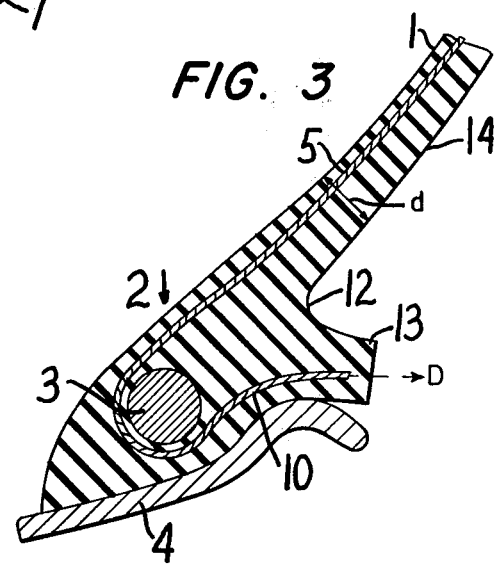

FIG. 3 shows (in radial cross section) a preferred embodiment of the invention; the upward-turned portion 10 of the carcass ply 5 is moved away or diverges from the sidewall portion of the carcass ply 5 towards the outside of the tire along a direction D which is substantially parallel to the axis of rotation of the tire. Furthermore, a circular groove 12 is formed between the annular projection 13 and the lower portion 14 of the sidewall 1, which has the effect of uncoupling the stresses between the elastic matrices surrounding the carcass ply 5 and each of its upward-turned portions 10, respectively. Finally, the upward-turned portion 10 of the carcass ply 5 is arranged approximately parallel to the engagement surface of the bead 2 on the rim 4.

In accordance with the invention, the thin, and therefore flexible, portion of the sidewall 1 is longer towards the bead rings 3 than in a tire of known type; it is thus seen that, at a slight distance above the wheel, the thickness d of the improved sidewall 1 (FIGS. 2 and 3) is much less than the thickness d' of a known sidewall 1 (FIG. 1). This arrangement considerably improves the distribution of the deformations of the sidewall. Furthermore, the upward-turned portion 7 (FIG. 2) or 10 (FIG. 3) of the carcass ply 5 is in the neutral zone upon flexing of the sidewall 1 during travel.

The improvement which forms the object of the invention is of particular interest on tires of large sizes used off highways, for instance in civil engineering work.

It will be understood that the invention is independent of the number and arrangement of the carcass plies; the latter may be radial or bias, partially radial and partially bias, etc. Likewise, the invention is independent of the materials used in the manufacture of the tire, as well as the shape of the wheels employed (which may have a conical or a cylindrical bead seat).

What is claimed is:

1. A pneumatic tire of large size used off the highway having a tread extended on each side by a sidewall terminating in a bead with a bead ring and having a carcass reinforcement with sidewall portions and porions turned upwards around said bead ring, characterized by the fact that the portions of said carcass reinforcement which have been turned upwards around the bead rings are spread towards the outside of the tire, diverge from the sidewall portions of the carcass reinforcement and are embedded in an annular portion of the tire which protrudes from an outer lower portion of the corresponding sidewall.

2. The pneumatic tire according to claim 1, characterized by the fact that the said annular portion is separated from the outer lower portion of the sidewall by a circular groove.

3. The pneumatic tire according to claim 1, characterized by the fact that each of said upward turned portions of the carcass reinforcement is arranged approximately parallel to the engagement surface of the bead on the rim.

4. The pneumatic tire according to claim 1, characterized by the fact that the direction of spread of the upward-turned portions of the carcass reinforcement towards the outside is substantially parallel to the axis of rotation of the tire.

* * * * *